United States Patent
Vitus et al.

(10) Patent No.: US 9,781,106 B1
(45) Date of Patent: Oct. 3, 2017

(54) METHOD FOR MODELING USER POSSESSION OF MOBILE DEVICE FOR USER AUTHENTICATION FRAMEWORK

(71) Applicant: Knowles Electronics, LLC, Itasca, IL (US)

(72) Inventors: Deborah Vitus, Mountain View, CA (US); Carlo Murgia, Sunnyvale, CA (US); James Steele, Los Gatos, CA (US); Frederic Caldwell, San Jose, CA (US)

(73) Assignee: Knowles Electronics, LLC, Itasca, IL (US)

( * ) Notice: Subject to any disclaimer, the term of this patent is extended or adjusted under 35 U.S.C. 154(b) by 346 days.

(21) Appl. No.: 14/548,207

(22) Filed: Nov. 19, 2014

Related U.S. Application Data (60) Provisional application No. 61/906,840, filed on Nov. 20, 2013.

(51) Int. Cl.
G06F 21/88 (2013.01)
H04L 29/06 (2006.01)
G06N 7/00 (2006.01)

(52) U.S. Cl.
CPC ......... *H04L 63/0861* (2013.01); *G06N 7/005* (2013.01)

(58) Field of Classification Search
CPC ..... H04L 63/08; H04L 63/0861; H04L 63/10; H04L 63/126; H04L 63/166; H04L 67/10; H04L 67/125; H04L 67/306; H04L 9/3231
See application file for complete search history.

(56) References Cited

U.S. PATENT DOCUMENTS 5,809,471 A 9/1998 Brodsky
6,243,476 B1 6/2001 Gardner
(Continued)

FOREIGN PATENT DOCUMENTS

WO WO2013148588 A1 10/2013
WO WO2014039552 A1 3/2014

OTHER PUBLICATIONS

Non-Final Office Action, Feb. 10, 2016, U.S. Appl. No. 14/216,446, filed Mar. 17, 2014.
(Continued)

*Primary Examiner* — Joseph P Hirl
*Assistant Examiner* — Sayed Beheshti Shirazi
(74) *Attorney, Agent, or Firm* — Foley & Lardner LLP (57) ABSTRACT

Method and systems for modeling user possession of a mobile device for a user authentication framework are provided. The method includes analyzing sensor data representing information captured from sensor(s) associated with at least one of a plurality of devices, the plurality including the user's mobile device. The method allows for determining, based on the analyzed sensor data, a probability that the user maintains possession of the user's mobile device; and configuring the probability for use in determining whether to require authentication. The determination may include configuring a probabilistic model that includes a first state indicating that the user possesses the mobile device and a second state indicating that the user does not; classifying motions of the mobile device by types, the motions being determined based on the sensor data; and updating probabilities of the two states in response to determining that at least one of the motions has occurred.

18 Claims, 7 Drawing Sheets

(56) References Cited

U.S. PATENT DOCUMENTS

| | | |
|---|---|---|
| 6,593,956 B1 | 7/2003 | Potts et al. |
| 7,131,136 B2 | 10/2006 | Monroe |
| 8,194,880 B2 | 6/2012 | Avendano |
| 8,326,625 B2 | 12/2012 | Adibi |
| 8,473,287 B2 | 6/2013 | Every et al. |
| 8,577,677 B2 | 11/2013 | Kim et al. |
| 8,712,069 B1 | 4/2014 | Murgia et al. |
| 8,787,587 B1 | 7/2014 | Murgia et al. |
| 8,880,396 B1 | 11/2014 | Laroche et al. |
| 9,185,487 B2 | 11/2015 | Solbach et al. |
| 9,195,994 B1 | 11/2015 | Ellis et al. |
| 2003/0016835 A1 | 1/2003 | Elko et al. |
| 2003/0236604 A1 | 12/2003 | Lu et al. |
| 2004/0044516 A1 | 3/2004 | Kennewick et al. |
| 2004/0052391 A1 | 3/2004 | Bren et al. |
| 2005/0008169 A1 | 1/2005 | Muren et al. |
| 2006/0217977 A1 | 9/2006 | Gaeta et al. |
| 2006/0247927 A1 | 11/2006 | Robbins et al. |
| 2007/0096979 A1 | 5/2007 | Hinnant et al. |
| 2008/0019548 A1 | 1/2008 | Avendano |
| 2008/0173717 A1 | 7/2008 | Antebi et al. |
| 2009/0055170 A1 | 2/2009 | Nagahama |
| 2009/0143972 A1 | 6/2009 | Kitamura et al. |
| 2009/0158423 A1* | 6/2009 | Orlassino ............ G06F 21/32 726/19 |
| 2009/0323982 A1 | 12/2009 | Solbach et al. |
| 2010/0033424 A1 | 2/2010 | Kabasawa et al. |
| 2010/0128881 A1 | 5/2010 | Petit et al. |
| 2010/0128894 A1 | 5/2010 | Petit et al. |
| 2010/0174506 A1 | 7/2010 | Joseph et al. |
| 2010/0312547 A1 | 12/2010 | Van Os et al. |
| 2010/0315905 A1 | 12/2010 | Lee et al. |
| 2010/0318257 A1 | 12/2010 | Kalinadhabhotla |
| 2011/0172918 A1 | 7/2011 | Tome |
| 2011/0239026 A1 | 9/2011 | Kulik |
| 2011/0257967 A1 | 10/2011 | Every et al. |
| 2012/0058803 A1 | 3/2012 | Nicholson |
| 2012/0071151 A1* | 3/2012 | Abramson ............ H04L 67/12 455/418 |
| 2012/0252411 A1 | 10/2012 | Johnsgard et al. |
| 2013/0045759 A1* | 2/2013 | Smith ............ H04W 64/00 455/456.6 |
| 2013/0106894 A1 | 5/2013 | Davis et al. |
| 2013/0253880 A1 | 9/2013 | Joseph et al. |
| 2013/0268792 A1* | 10/2013 | Saitou ............ G06F 1/3234 713/323 |
| 2013/0297926 A1 | 11/2013 | Eaton et al. |
| 2013/0332156 A1 | 12/2013 | Tackin et al. |
| 2014/0068692 A1* | 3/2014 | Archibong ......... H04L 65/4084 725/116 |
| 2014/0137191 A1* | 5/2014 | Goldsmith ............ H04L 63/08 726/3 |
| 2014/0226837 A1* | 8/2014 | Grokop ............ H04M 1/6016 381/103 |
| 2014/0244273 A1 | 8/2014 | Laroche et al. |
| 2014/0316783 A1 | 10/2014 | Medina |
| 2014/0342758 A1 | 11/2014 | Aleksy et al. |
| 2014/0351560 A1* | 11/2014 | Lautner ............... G06F 3/0346 712/30 |
| 2015/0012248 A1 | 1/2015 | Meduna et al. |
| 2015/0081296 A1 | 3/2015 | Lee et al. |
| 2015/0247729 A1 | 9/2015 | Meduna et al. |
| 2016/0061934 A1 | 3/2016 | Woodruff et al. |
| 2016/0134609 A1* | 5/2016 | Durham ................ H04L 63/08 726/7 |
| 2016/0164577 A1* | 6/2016 | Rexroad ................ H04B 5/06 455/416 |

OTHER PUBLICATIONS

Non-Final Office Action, Apr. 22, 2016, U.S. Appl. No. 13/849,448, filed Mar. 22, 2013.

Non-Final Office Action, Apr. 25, 2016, U.S. Appl. No. 14/666,312, filed Mar. 24, 2015.

International Search Report and Written Opinion mailed Jul. 3, 2013 in Patent Cooperation Treaty Application No. PCT/US2013/033727, filed Mar. 25, 2013.

International Search Report and Written Opinion mailed Dec. 2, 2013 in Patent Cooperation Treaty Application No. PCT/US2013/058055, filed Sep. 4, 2013.

Vinande et al., "Mounting-Angle Estimation for Personal Navigation Devices," IEEE Transactions on Vehicular Technology, vol. 59, No. 3, Mar. 2010, pp. 1129-1138.

Zhao et al., "Towards Arbitrary Placement of Multi-Sensors Assisted Mobile Navigation System," In Proceedings of the 23rd International Technical Meeting of the Satellite Division of The Institute of Navigation, Portland, OR, Sep. 21-24, 2010, pp. 556-564.

Joseph, Benjamin E. et al., "System and Method for Determining a Uniform External Magnetic Field," U.S. Appl. No. 61/615,327, filed Mar. 25, 2012.

International Search Report and Written Opinion mailed Mar. 16, 2016 in Patent Cooperation Treaty Application No. PCT/US2015/067966, filed Dec. 29, 2016.

Laroche, Jean et al., "Noise Suppression Assisted Automatic Speech Recognition", U.S. Appl. No. 12/962,519, filed Dec. 7, 2010.

Medina, Eitan Asher, "Cloud-Based Speech and Noise Processing", U.S. Appl. No. 61/826,915, filed May 23, 2013.

Laroche, Jean et al., "Adapting a Text-Derived Model for Voice Sensing and Keyword Detection", U.S. Appl. No. 61/836,977, filed Jun. 19, 2013.

Murgia, Carlo, "Continuous Voice Sensing", U.S. Appl. No. 61/881,868, filed Sep. 24, 2013.

Medina, Eitan Asher, "Personalized Operation of a Mobile Device Using Acoustic and Non-Acoustic Information", U.S. Appl. No. 14/542,327, filed Nov. 14, 2014.

Verma, Tony, "Context Aware False Acceptance Rate Reduction", U.S. Appl. No. 14/749,425, filed Jun. 24, 2015.

* cited by examiner

METHOD FOR MODELING USER POSSESSION OF MOBILE DEVICE FOR USER AUTHENTICATION FRAMEWORK

CROSS-REFERENCE TO RELATED APPLICATION

The present application claims the benefit of U.S. Provisional Application No. 61/906,840, filed on Nov. 20, 2013. The subject matter of the aforementioned application is incorporated herein by reference for all purposes.

FIELD

The present application relates generally to authentication, and more specifically to systems and methods regarding authentication of users based on sensor data.

BACKGROUND

Mobile devices are widely used for various applications. Some mobile applications, for example, those designed for reading and writing email messages, messages for social networks, banking, and payment processing, may require a high level of confidence that the mobile device is being used by its owner. In other applications, for example, in those designed to take pictures or browse public internet pages, there may be no need for such a high level of confidence.

One of the conventional solutions to ensure the mobile device is in possession of its owner is to lock the mobile device if it has not been used for a pre-determined period of time. Then, the owner of the mobile device can be asked to provide login credentials each time he or she wants to regain access to the mobile device. For example, the owner can be asked to enter the user password or asked for a fingerprint to be taken. This conventional approach may be very inconvenient in some situations, for example, when the user needs to take a photo to capture some fleeting moment that would be otherwise lost if time had to be taken first to provide user credentials or have a fingerprint taken. There is also the inconvenience associated with needing to reenter credentials or have a fingerprint taken even though the mobile device has remained in the user's possession for longer than the pre-determined period for locking of the mobile device.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The systems and methods for modeling user possession of a mobile device for a user authentication framework are provided. According to an example embodiment, the method can include analyzing sensor data. The sensor data can represent information captured from one or more sensors associated with at least one of a plurality of devices. The method can further include determining, based on the analyzed sensor data, a probability that the user is in possession of a mobile device, the mobile device being one of the plurality of the devices. Various embodiments of the method also include configuring the probability for use in determining whether to require authentication. The authentication may be reauthentication and may be either passive or require action by a user.

In some embodiments, the analyzing of the sensor data includes monitoring the sensor data.

The sensors can include at least one of the following: motion sensors, inertial sensors, visual sensors, location sensors, bio sensors, audio sensors, and proximity sensors. In certain embodiments, devices of the plurality of the devices are communicatively coupled via a network and are operable to exchange the sensor data with each other. In some embodiments, the sensor data can include a representation of at least one feed from at least one social network.

In some embodiments, the determination of a probability that the user is in possession of the mobile device is based on an analysis of coherence of the sensor data received from at least two devices of the plurality of the devices. The determined probability may be further configured for use in granting access to a number and a type of applications.

In some embodiments, determining probability of the user possessing the mobile device includes configuring a first probabilistic model. The first probabilistic model can include at least two states: "the user is in possession of the mobile device" and "the user is not in possession of the mobile device". The method can further include classifying motions of the mobile device by type. The motions can be determined based on sensor data received from one or more devices of the plurality of the devices. The method can allow updating probabilities of the two states in response to determining that at least one of the motions has occurred.

In some embodiments, the probabilities of the two states are updated based on the type of the motions, probabilities of determining the motions, and a number of motions occurring in a pre-determined time period.

In some embodiments, the method can further include determining a location of the mobile device with respect to the user. The location of the mobile device can be determined based on the sensor data using a second probabilistic model. The method can include adjusting the probability of the two states and probabilities of determining the motions based on the determined location of the mobile device.

In some embodiments, the method includes providing a location of the mobile device with respect to the user and the probabilities of the two states to the mobile device to facilitate determining whether to require user interaction for active authentication.

In some embodiments, the probabilities of the two states are reset to predetermined initial values using a user authentication mechanism provided by an original equipment manufacturer of the mobile device.

According to another example embodiment of the present disclosure, the steps of the method for authentication of a user based on sensor data are stored on a machine-readable medium comprising instructions, which when implemented by one or more processors perform the recited steps.

Other example embodiments of the disclosure and aspects will become apparent from the following description taken in conjunction with the following drawings.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

The present disclosure provides example systems and methods for facilitating authentication of users based on sensor data. As used herein, "sensor data" may refer variously to raw data, processed data, and/or a representation of raw or processed data from one or more sensors. Embodiments of the present disclosure can be practiced, but not limited to, on various mobile devices, for example, a smart phone, a mobile phone, a tablet computer, an all-in-one, a laptop computer, a wearable (e.g., smart watch, smart glasses, etc.), a car communication system, an infotainment system, a teleconference system, and so forth. The mobile devices can be used in stationary and portable environments. Stationary environments can include residential and commercial buildings or structures, and the like. Portable environments can include moving vehicles, moving persons, other transportation means, and the like.

According to an example embodiment, a method for modeling user possession of a mobile device for a user authentication framework is provided. The method includes analyzing sensor data received from sensors. In various embodiments, the sensor data represents information captured from one or more sensors associated with at least one of a plurality of devices. The representation may involve multiple sensors. The analysis involving information captured from multiple sensors may be referred to variously herein as "sensor fusion".

The method can proceed with determining, based on the analyzed sensor data, a probability that the user is in possession of a mobile device, the mobile device being one of the plurality of the devices. The method can continue with configuring the probability for use in determining whether to require user authentication. In some embodiments, the probability is used to determine a passive authentication technique is warranted wherein the probability that the user is possession of the mobile device is determined to exceed a predetermined threshold based on the analyzed sensor data without requiring the user to provide some predetermined authentication such as credentials, a fingerprint, or other suitable identification. In various embodiments, the probability is used to determining whether to require active authentication that requires the user to (actively) provide the predetermined authentication such as credentials, a fingerprint, or other suitable identification.

Figure 1:
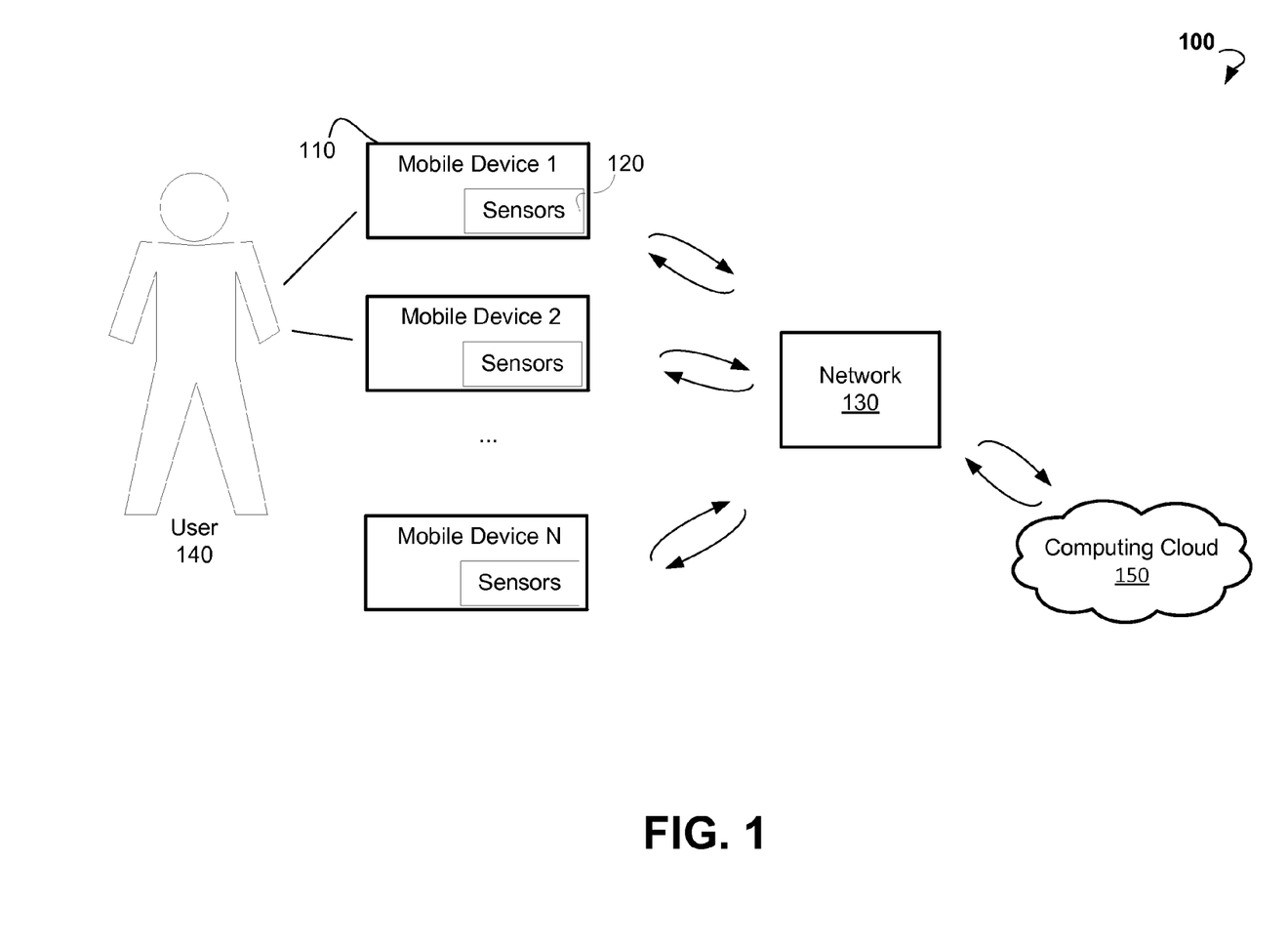
FIG. 1 is a block diagram showing an example environment within which systems and methods for the present technology can be practiced.

Referring now to FIG. 1, an example system 100 for facilitating authentication of a user based on sensor data is shown. The example system 100 can include one or more mobile devices 110. Each of the mobile devices 110 can include sensors 120.

The sensors 120, in various embodiments, include motion sensors, inertial sensors, proximity sensors, visual sensors, audio sensors, location sensors, and the like. For example, the sensors 120 can include an accelerometer, a magnetometer, a gyroscope, an Inertial Measurement Unit (IMU), a temperature sensor, an altitude sensor, a proximity sensor, a barometer, a humidity sensor, a color sensor, a light sensor, a pressure sensor, a Global Positioning System (GPS) module, a beacon, a (video) camera, a WiFi sensor, an ultrasound sensor, an infrared sensor, a touch sensor, and an audio sensor. The video camera is configured to capture still or motion images of an environment. The images captured by the video camera may include pictures taken within the visible light spectrum or within a non-visible light spectrum such as the infrared light spectrum ("thermal vision" images). The video camera can generate a video signal of the environment, which may include one or more sound sources (for example, talkers) and optionally one or more noise sources (for example, other talkers and operating machines). In some embodiments, the audio sensor can include one or more microphones configured to capture acoustic sounds. The acoustic sounds can include sounds in the human hearing range and/or out of the human hearing range.

In further embodiments, the sensors 120 include a bio sensor, photoplethys-mogram (PPG), a Galvanic skin response (GSR) sensor, an ion gas analyzer, an electroencephalogram (EEG), or an electrocardiogram (EKG). In some embodiments where the mobile device is a wearable, the sensors 120 include a top microphone and a bottom microphone.

In some embodiments, the sensors 120 include a "social sensor". The social sensor includes feeds, or representations of feeds, from social networks (such as, for example, Twitter, Instagram, Facebook, and so forth) that the mobile device 110 is operable to receive. The mobile device can be operable to share the social sensor data (e.g., a social media feed or representation thereof) with other mobile devices and/or process the social sensor data in combination with other sensor data and/or audio data. For example, a feed from social sensors can indicate that there is a parade or a demonstration congregating within an area. The method may use this information (e.g., representation of the feed as a "social sensor") to glean information associated with the location that the user of the mobile device is heading to, or to which the user is planning to head.

The sensors 120 may include the "Internet of things". The Internet of things can provide for the ability of the mobile device 110 to share information with other mobile devices nearby. The information may include inputs from sensors and microphones belonging to the mobile device 110 and information obtained as a result of processing a combination of sensor data (a "sensor fusion" or a "sensor mesh"). The mobile device 110 may pass the information which was obtained from other mobile device to yet another mobile device. The mobile device 110 may selectively receive information from other mobile devices in order to ascertain context associated with an environment in which the mobile device is being operated and process the combination of local sensor data and information from other mobile devices.

Some of the mobile devices 110 are associated with a user 140. For example, mobile devices 110 associated with the user 140 can include a smart phone, a tablet computer, an all-in-one computer, a smart watch, a smart glass, and so forth. In various embodiments, some of the mobile devices 110 are not associated with the user 140. For example, some of the mobile device 110 can include mobile devices associated with users other than user 140. In some embodiments, the mobile device 110 can include a car communication system, a teleconference system, a radio, an ultrasonic beacon, and the like.

In some embodiments, the mobile devices 110 are operable to exchange data between each other, for example, sensor data. In certain embodiments, the data is exchanged using a wireless or wired network(s) 130 using, for example, an Internet protocol. The mobile devices 110 can be connected to network(s) 130 via Wi-Fi, Bluetooth, NFC, and the like.

In some embodiments, the mobile devices 110 are communicatively connected to a cloud-based computing resource(s) 150 (also referred to as "computing cloud 150"). The cloud-based computing resources 150 can include computing resources (hardware and software) available at a remote location and accessible over a network (for example, the Internet). The cloud-based computing resources 150 can be shared by multiple users and can be dynamically reallocated based on demand. The cloud-based computing resources 150 may include one or more server farms/clusters including a collection of computer servers which can be co-located with network switches and/or routers. In various embodiments, the mobile devices 110 can be connected to the computing cloud 150 via one or more wired or wireless network(s) 130. The mobile devices 110 can be operable to send data to computing cloud 150, request computational operations to be performed in the computing cloud, and receive back the results of the computational operations.

Figure 2:
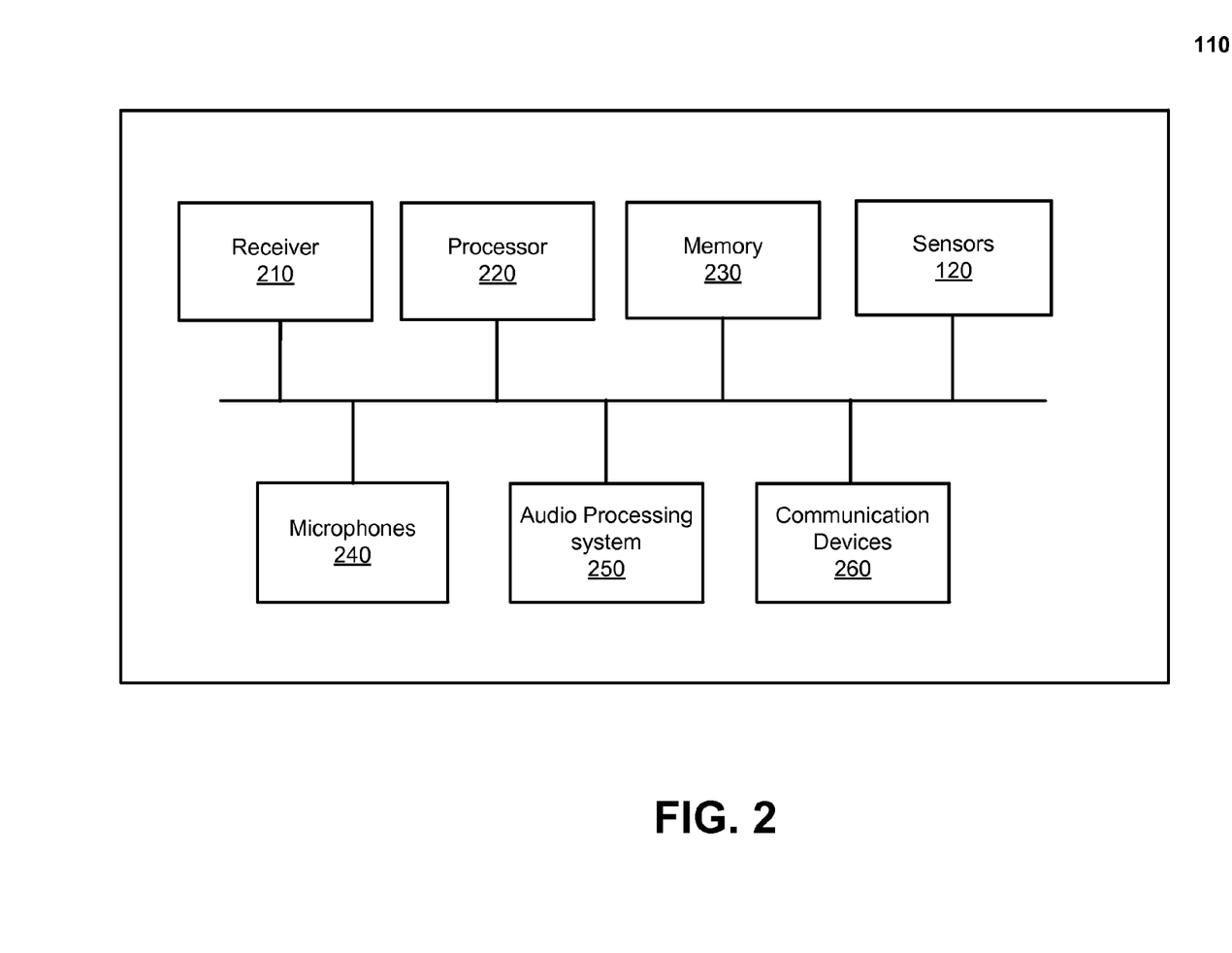
FIG. 2 is a block diagram of an example device which can be used to practice the present technology.

FIG. 2 is a block diagram showing components of an exemplary mobile device 110, according to example embodiments. In the illustrated embodiment, the mobile device 110 includes at least a receiver 210, a processor 220, memory 230, sensors 120, microphones 240, audio processing system 250, and communication devices 260. The sensors 120 in this example can also include other sensors as described herein, e.g., the social sensor representing information from at least one social network source that may be accessible on and/or by the mobile device. The mobile device 110 may also include additional or other components necessary for operations of mobile device 110. In other embodiments, the mobile device 110 can include fewer components that perform similar or equivalent functions to those depicted in FIG. 2.

The processor 220 can include hardware and/or software, which is operable to execute computer programs stored in a memory 230. The processor 220 can use floating point operations, complex operations, and other operations, including steps of the method for authentication of a user based on sensor data. In some embodiments, the processor 220 of the mobile device, for example, can include at least one of a digital signal processor, an image processor, an audio processor, a general-purpose processor, and the like.

The audio processing system 250 may be configured to receive acoustic signals representing sounds captured from acoustic sources via microphones 240 and process the acoustic signals components. In certain embodiments, the microphones 240 are spaced a distance apart such that acoustic waves impinging on the device from certain directions exhibit different energy levels at the two or more microphones. After reception by the microphones 240, the acoustic signals may be converted into electric signals. These electric signals may themselves be converted by an analog-to-digital converter (not shown) into digital signals for processing in accordance with some embodiments. The processed audio signal can be transmitted for processing to the processor 220, stored in memory storage 230, and/or transmitted to a computing cloud for further processing.

In various embodiments, where the microphones 240 are omni-directional microphones that are closely spaced (e.g., 1-2 cm apart), a beamforming technique can be used to simulate a forward-facing and a backward-facing directional microphone response. A level difference can be obtained using the simulated forward-facing and the backward-facing directional microphone. The level difference can be used to discriminate speech and noise in, for example, the time-frequency domain, which can be used in noise and/or echo reduction. In some embodiments, some microphones are used for the most part to detect speech and other microphones are used for the most part to detect noise. In various embodiments, some microphones are used to detect both noise and speech. Noise can include unwanted sounds such as, for example, street noise, ambient noise, speech from entities other than an intended speaker(s), distracting sounds due to operations of machines, cars, and the like.

In some embodiments, noise reduction can be carried out by the audio processing system 250 noise based on inter-microphone level difference, level salience, pitch salience, signal type classification, speaker identification, and so forth. An example audio processing system suitable for performing noise reduction is discussed in more detail in U.S. Pat. No. 8,473,287, issued on Jun. 25, 2013, the disclosure of which is incorporated herein by reference for all purposes.

In some embodiments, the noise reduction includes noise cancellation and/or noise suppression. By way of example and not limitation, noise reduction methods are described in U.S. patent application Ser. No. 12/215,980, filed Jun. 30, 2008, and in U.S. Pat. No. 8,194,880, issued on Jun. 5, 2012, which are incorporated herein by reference in their entireties.

Communication device 260 can include modules operable to communicate data between mobile devices 110 and computing cloud(s) 150 via a network. In various embodiments, the communication devices can include a Bluetooth module, an Infrared module, a Wi-Fi module, an NFC module, beacon module, and the like.

In some embodiments, the sensor data of a mobile device 110 (as shown in example in FIG. 1) can be transmitted to the processor 220 of at least one of the mobile devices 110 for processing, stored in the memory storage 230 of at least one of the mobile devices 110, and/or transmitted to a computing cloud 150 for further processing.

In an example embodiment, a combination of sensor data obtained from several mobile devices, for example, smart phones belonging to several people, can be used to detect an occurrence of an event. For example, an occurrence of an earthquake can be detected. The mobile device can read motion sensor data (e.g., from an accelerometer, a gyroscope, an IMU, and the like) and determined that the mobile device is shaking. The mobile device may request and obtain motion data from surrounding mobile devices to determine whether the surrounding mobile devices are shaking as well. By analyzing the sensor data received from the surrounding mobile devices, or receiving an indication of whether other mobile devices are shaking, the mobile device may determine whether the earthquake has occurred.

In another example embodiment, a combination of sensor data obtained from several mobile devices belonging to a group of several people can be used to determine whether one or more members of the group provide data different from the data provided by other members of the group. For example, a mobile device is operable to monitor a body temperature of a person using mobile device that includes a bio sensor, a skin sensor, and the like. The mobile device may detect that one person in a group of persons is sweating while other people in the group are not. The mobile device of that person can obtain an indication of a difference in body temperature and associate the indication of the difference in body temperature with a potential sickness or other health problem.

Figure 3:
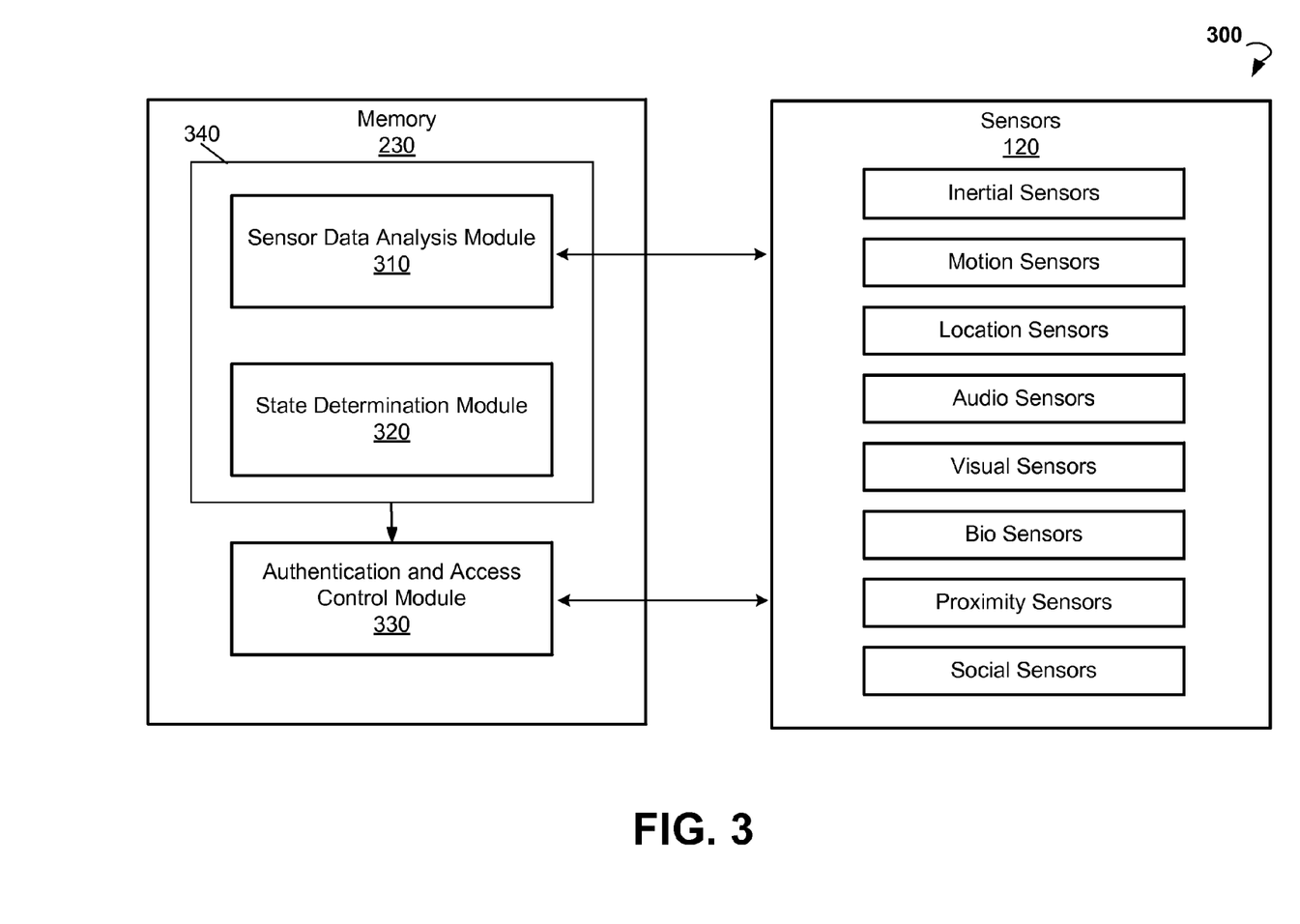
FIG. 3 is a block diagram illustrating an exemplary system including modules for the method for the present technology, according to various example embodiments.

FIG. 3 is a block diagram illustrating an exemplary system 300 including modules for a method of facilitating authentication of a user using sensor data, according to an example embodiment. The example system 300 can include a sensor data analysis module 310, a state determination module 320, and an authentication and access control module 330. In some embodiments, the modules of system 300 are stored as instructions in memory storage 230 of the mobile device 310 to be executed by processor 220.

The sensor data analysis module 310 can be configured to receive sensor data representing information captured from one or more sensors of the mobile device as well as sensor data of other mobile devices. The received sensor data can be analyzed to determine any changes in sensor data. For example, sensor data from or representing information captured from proximity, motion and inertial sensors can be used to determine a trajectory of a motion of the mobile device relative to a user of the mobile device, and/or relative to the surrounding mobile devices, for example, a wearable of the user or another mobile device. The type of trajectory and/or sensor data can be passed to state determination module 320.

In some embodiments, the state determination module 320 is operable to determine, based on sensors data, a probability that the mobile device 110 remains under control of the owner ("on Owner" state) or is not under control of the owner ("off Owner" state). In certain embodiments, the probability may be a percentage. In other embodiments, the probability may be used to determine a level of confidence that the mobile device 110 is in "on Owner" state. In some embodiments, the state determination module 320 and sensor data analysis module 310 are included in a combined module 340.

In various embodiments, the level of confidence or probability is configured (e.g., in combined module 340) for use in determining whether to require authentication. For example, the probability (or level of confidence) can be configured for use by the authentication and access control module 330 to which the probability may be passed.

In various embodiments, the authentication and access control module 330 is operable to receive the configured probability provided by the method of the present technology and use the configured probability in order to make a determination of the level of access to allow, the additional authentication to require for certain access, and the like for the mobile device. In this exemplary embodiment, the method does not provide the functionality of the authentication and access control module 330 but rather provides the probability or level of confidence the authentication and access control module 330 in some configured form. The authentication and access control module 330 may be operable to determine, based on the configured probability or level of confidence (e.g., received from the combined module 340 or from just the state determination module 320), and possibly the sensor data, whether the one in possession of the mobile device is required to pass an active authentication in order to obtain a full or partial access to the mobile device's functionalities and applications. Active authentication may include prompting the user to provide a text password, a voice password, a fingerprint, and the like. In some embodiments of the method of the present technology, the functionality of the authentication and access control module 330 can be included.

In certain embodiments, the authentication of the user can be performed passively without requiring the user to enter a password (e.g., passive authentication.) Passive authentication provides that, based on the level of confidence or probability (exceeding some threshold, for example), the user can obtain full or partial access to the mobile device's functionalities and applications. In situations where the level of confidence is not high enough, the user access may be given limited access to the mobile device, e.g., to only certain of the mobile device's applications and functionalities. For example, the user might be allowed some capability to browse the Internet with the mobile device (e.g., to search), but not allowed to order or pay for services and goods using the mobile device. To regain the full control or full access, the user may be required to provide active authentication.

Figure 4:
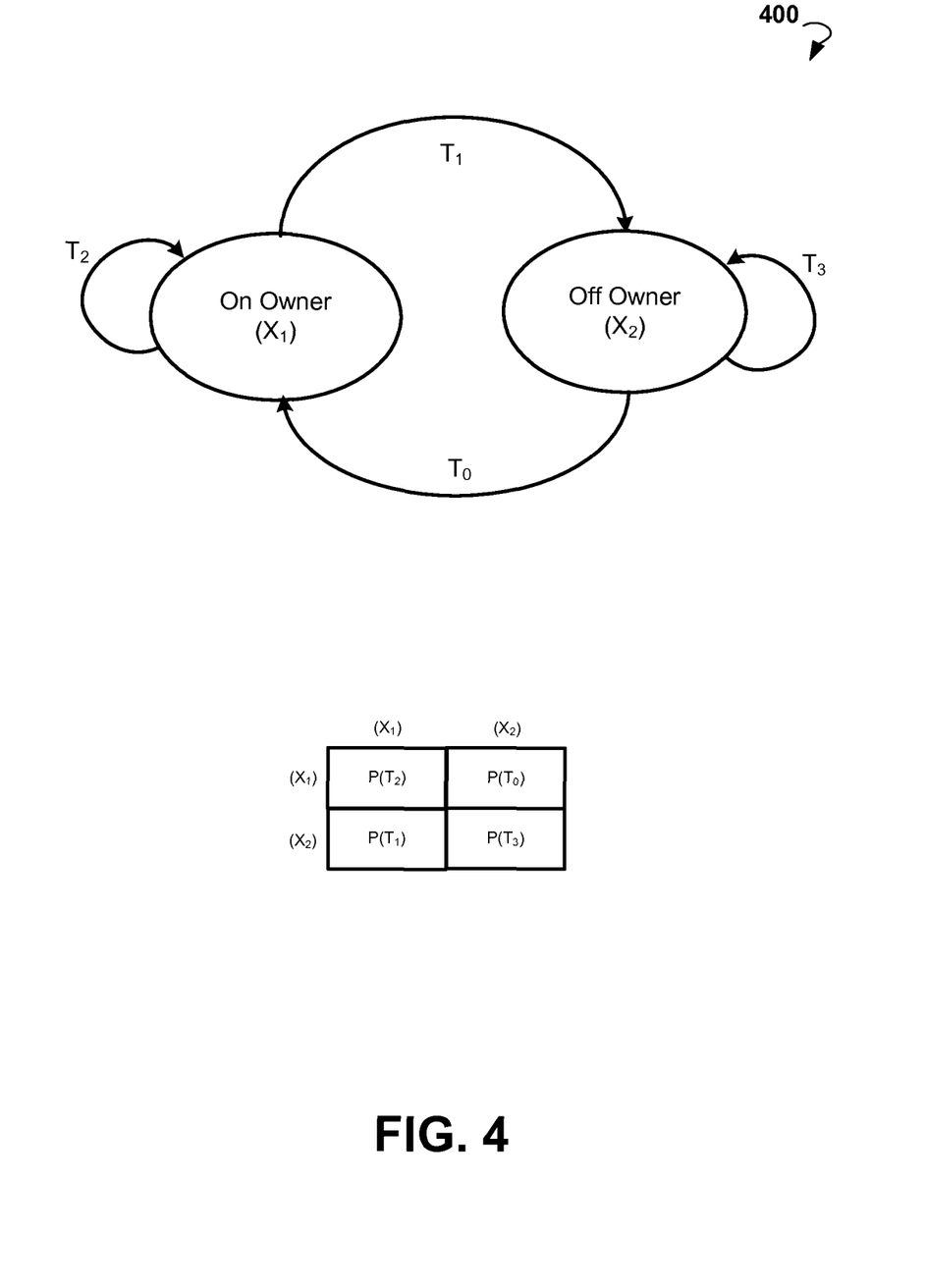
FIG. 4 is a block diagram showing an example of determining states associated with a mobile device.

FIG. 4 is block diagram showing an example of a probabilistic model 400 which defines a specific state associated with a mobile device. The probabilistic model 400 can be used to determine the state of the mobile device and a confidence level of whether the mobile device is the under owner's control.

The example probabilistic model 400 includes a Markov model including states "on Owner" $X_1$ and "off Owner" $X_2$ and four transitions $T_0$, $T_1$, $T_2$, and $T_3$. Probabilities of transitions $P(T_0)$, $P(T_1)$, $P(T_2)$, and $P(T_3)$ are determined based on features, for example, type of motions of the mobile device. The type of motions can be determined based on sensor data and audio received by the mobile device and sensor data and audio received by the mobile device from surrounding mobile devices.

In some embodiments, while operating in state $X_1$ ("On Owner") or in state $X_2$ ("off Owner") the mobile device is configured to detect a motion, or other sensor data, of the mobile device and classify the motion, or other sensor data. Initially, to switch the mobile device from state $X_2$ to state $X_1$, an active authentication of the user (the owner) can be required. The initial authentication can be performed by asking the user to type a password, provide a fingerprint, a voice command, or other identification requiring a user action. An initial confidence level that the mobile device is in "on Owner" state may be determined based on a type of the initial identification. For example, upon entering the state $X_1$ by providing a fingerprint, the confidence level can be set high, for example at 95-99%.

While in state $X_1$, a passive authentication of the user can be carried out based on types of motions and other sensor data. The confidence level that mobile device is in "On Owner" state can be reduced with time based on a type of a motion of the mobile device or other sensor data. In some embodiments, the confidence level can be scaled based on a number of motions, or other sensor data, occurring within a pre-determined period of time. In certain embodiments, the confidence level is scaled based on how many motions, or other sensor data, have occurred and how many times the motions, or other sensor data, are classified correctly. If no motions or other sensor data have occurred within a predetermined period of time, the confidence is not decreased. In some embodiments, the confidence level is adjusted using information from other sensors, for example, a GPS, a Wi-Fi sensor, a beacon, and the like.

The actions associated with transition $T_2$ when the mobile device has not changed the state $X_1$ include, for example, putting the mobile device in a pocket, getting the mobile device out of pocket to answer a phone call, taking a picture by the mobile device, a GPS reading, and the like. The current confidence level associated with the state $X_1$ ("On Owner") can be used to restrict or grant to user access to applications and functionalities of the mobile device.

In some embodiments, a probabilistic model similar to model 400 can be used to determine a "carry context" associated with the mobile device. The carry context may be used by model 400 (or incorporated therein). By way of example and not limitation, exemplary systems and methods for determining a "carry context" of the mobile device using a probabilistic model are described in U.S. application Ser. No. 14/321,707, filed on Jul. 1, 2014, which is incorporated herein by reference in their entireties.

Determining the carry context includes understanding how the mobile device is being held or carried by the user; whether the mobile device is in the user's hand, whether the user is looking at the mobile device, whether the mobile device is in a pocket, whether the mobile device is on worn on a wrist as a wearable, and so on. The carry context can be determined by analyzing motions of the mobile device and surrounding mobile devices, data from a proximity sensor, a skin sensor, a temperature sensor and the like. In various embodiments, the mobile device is capable of learning or remembering various actions associated with a user. The mobile device is capable of making probabilistic state determinations based upon these learned or remember actions and comparing them to sensor data.

In some embodiments, the carry context includes determining where the mobile device is located at the moment: on a user, where on the user, or off the user. When the probability that the mobile device is "off owner" is high, the mobile device can be switched from state $X_1$ to state $X_2$.

As an example, a mobile device is in state $X_1$ and it is known that the mobile device is in the user pocket. The mobile device can detect a motion corresponding being taken "out of pocket" and determine whether the mobile device is being held by a hand of the user based on changes in the data from inertial sensors, proximity sensors, and/or temperature sensors. Knowing that the mobile device is located on the owner at a certain place, for example in his/her pocket, increases the confidence of classifying possible motions.

In some embodiments, a probabilistic state of the mobile device is determined based on a mesh of sensor data from two or more mobile devices associated with the user. The mobile device can monitor coherence of data obtained from sensors of several mobile devices. The mobile device can determine that probability of transitioning from state $X_1$ to state $X_2$ is high if sensor data is obtained from the mobile device is not in agreement with sensor data obtained from other mobile devices.

If, for example, a user has a mobile device (e.g., a mobile phone) and also has another mobile device in the form of a wearable (e.g., on the user's wrist, ankle, etc.), the mobile phone can determine, based on mobile devices' sensor data, that the mobile phone remains stationary while the wearable indicates that the user is moving. If this is the case, the mobile phone may switch to "Off Owner" state since the motion of the wearable does not match the motion of the mobile phone. In certain embodiments, a distance between the mobile phone and the wearable can be traced using, for example, inertial sensors. The mobile phone can be switched to the "Off Owner" state when the distance between the mobile phone and the wearable becomes larger than a pre-determined maximum distance. Although this example is described regarding a mobile phone, various embodiments may be practiced for other suitable mobile devices.

Figure 5:
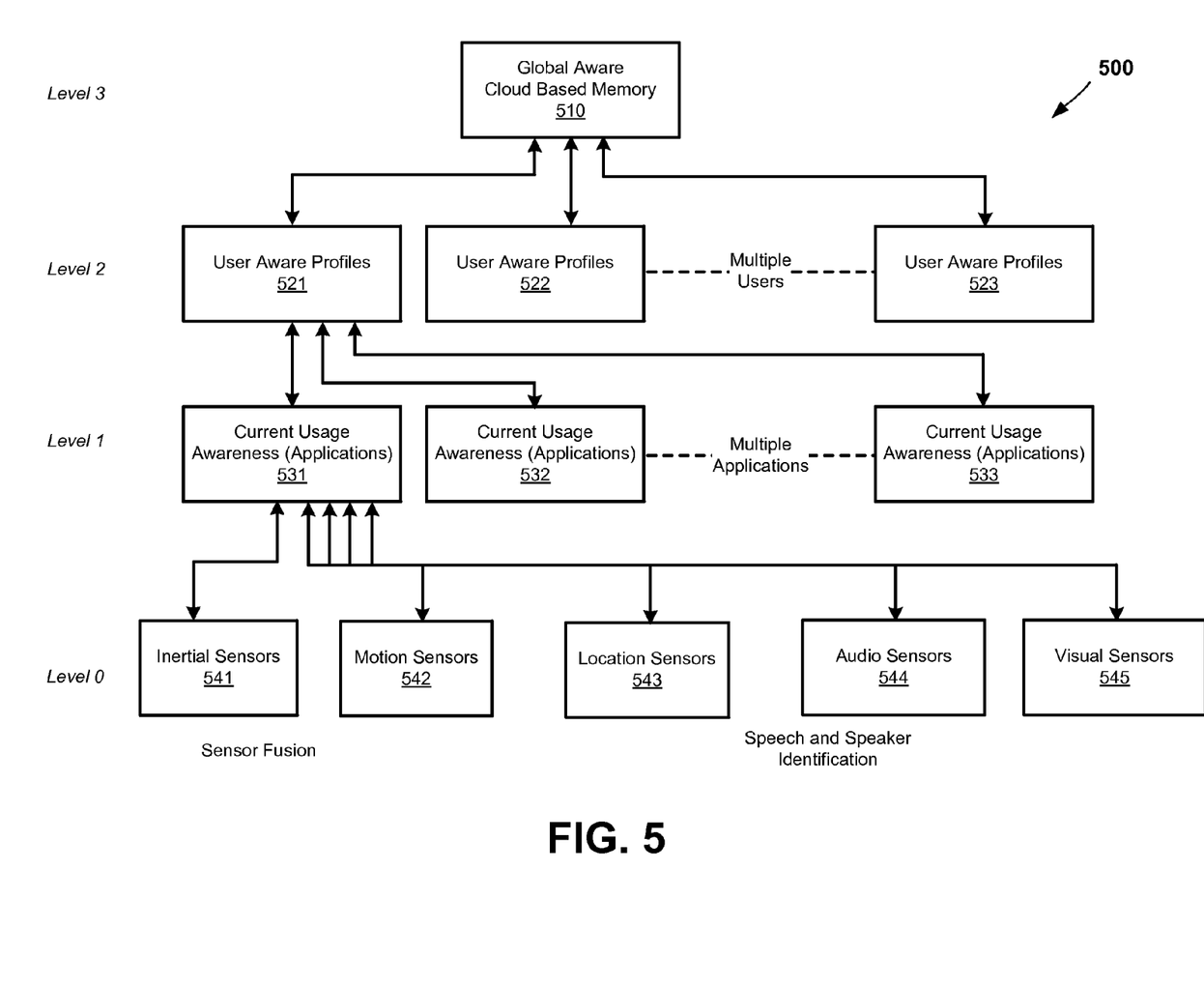
FIG. 5 is a block diagram showing a decision tree for sensor fusion, according to an example embodiment.

FIG. 5 is a block diagram showing a decision tree 500 for sensor fusion, according to an example embodiment. At level 3, the decision tree 500 can include a global aware cloud based memory 510. At level 2, the decision tree 500 can include user aware profiles 521-523 connected to the global aware cloud based memory 510. At level 1, the decision tree 500 can include current usage awareness 531-533 associated with each user aware profile 521-523. At level 0, the decision tree 500 can include sensors. The sensors can include inertial sensors 541, motion sensors 542, location sensors 543, audio sensors 544, and visual sensors 545.

In some embodiments, the decision tree 500 is implemented in system 100 of FIG. 1. The decision tree 500 may allow processing some complex functions in the computing cloud and delivering end-point specific data to the mobile sensors. In decision tree 500, lower levels can make decisions based on activity, locality, and ambient information, while higher levels (e.g., level 3) can make decisions based on global context and high bandwidth computations. In certain embodiments, data and decisions may flow up and down the tree. In some embodiments, triggers flow up the decision tree (e.g., from sensors in level 0) and, thereby, enable minimum active duty cycles for network/platform resources which can be heavily multi tasked. In certain embodiments, blocks of memory containing context information can flow down the decision tree on an "as needed" basis and, thereby, substantially reducing power consumption and the cost of memory requirements at lower levels.

In some embodiments, cost of memory can be very high at lower levels. Additionally, memory can cause power consumption, especially, for example, leakage power. Hence, the memory allocation can be kept to a minimum in the lower levels. For example, memory such as Static random-access memory (SRAM) at lower levels needs to be programmable since it may not be retained across power cycles. In some embodiments, at higher level storage (persistent memory, for example, Flash or hard disk) may be less expensive. Hence, a "context aware block caching" may be provided whereby higher levels, upon receiving triggers from lower levels, may take the following exemplary steps:

1) evaluate the validity of the trigger and established context, for example, determine whether the user is walking, web surfing, making phone calls, and so on. At higher levels, the context information is determined for a per user or per network level.

2) extract relevant context information and refresh (may swap old information out and push down new information) the block cached information at the lower levels. By way of example and not limitation, the context information may include key words, motion thresholds, acceleration profiles, user trained phonemes, security and authentication certificates, user dependent vocal recognition databases, and so on. For example, once level 2 decides that the current usage context is photography, the level 2 sends down a database which includes commands for camera control. Level 0 devices can swap out old commands and replace them with camera control commands. The recited steps may be replicated between every set of levels in the hierarchy.

In another example, there are two subsystems. The first subsystem is configured to receive and process audio and the second subsystem is configured to read and process data from sensors. The audio subsystem can provide processed audio streams (for example, a speech stream and a background stream) to a server. The server can use the audio speech stream to communicate with the far end mobile device (e.g., mobile phone) and use the background stream to analyze the type of background (noise). For example, the analysis can determine that the noise includes automobile noise with music playing from the stereo. This information can be passed back down to the sensor subsystem and allow the sensor subsystem to resolve disambiguation between motion analyzed by this subsystem. For example, the subsystem may use this information about the noise in order to distinguish whether the motion is caused by a car driving on a rough road with bumps or by a person composing a text message while driving. Similarly, the sensor subsystem can decide to shut down, for some time, one or more sensors (for example, the atmospheric pressure sensor) because these sensors are not useful in this context. In addition, the talker can be identified by the voice extracted from the audio speech stream and this information can be passed to the sensor subsystem to upload a user profile.

In another example, the sensor data is collected from sensors and fused, at some level, into the sensory subsystem. The result of fusion can be passed to the application processor (AP) to be fused with other information (for example, GPS or WiFi). The AP, at this point, can determine the location of the mobile device with respect to the user. For example, a direct WiFi link can be used to recognize that the user is not wearing the mobile phone at the moment he or she speaks because the motion of a wearable watch mobile device that he or she is wearing does not correspond to the motion of the mobile phone being used for the conversation. Based on the determined location of the mobile phone (e.g., further away than the watch from the user), the AP can decide to change the configuration of the voice communication system by loading the Far Far Field (more than 1 m up to 8 m) noise suppression configuration to improve the quality of the communication.

Other examples may include audio and video subsystems (for security enhancement) or two different sensor subsystems or two audio subsystems or the combination of all the above.

Figure 6:
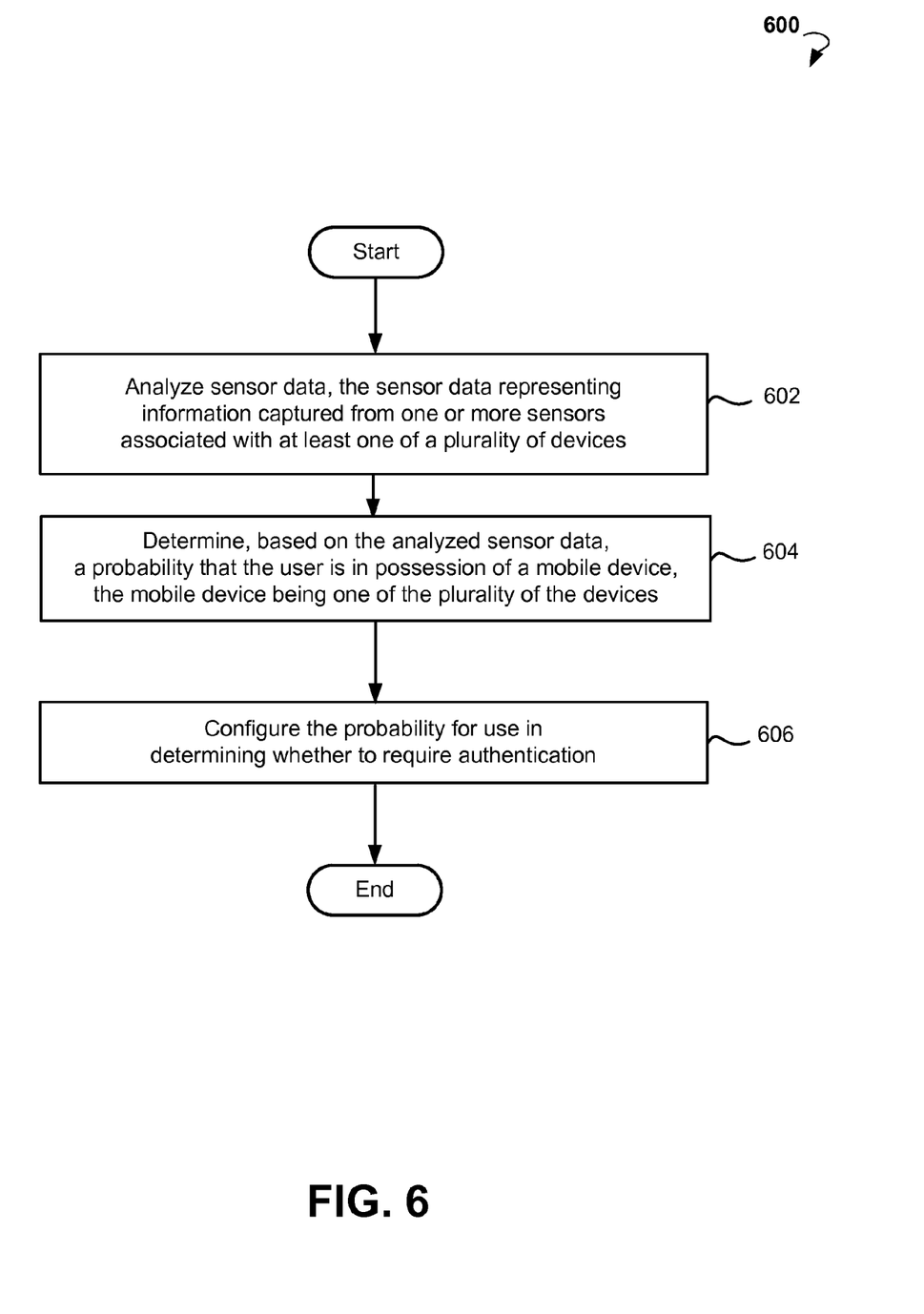
FIG. 6 is a flow chart showing steps of an exemplary method for the present technology.

FIG. 6 is flow chart diagram showing steps of an exemplary method 600 for facilitating authentication of a user based on sensor data. The method 600 can commence at step 602 with analyzing s sensor data, the sensor data representing information captured from one or more sensors associated with at least one of a plurality of devices. At step 604, the method can proceed with determining, based on the analyzed sensor data, a probability that the user is in possession of a mobile device, the mobile device being one of the plurality of the devices. At step 606, the method can continue with configuring the probability for use in determining whether to require authentication.

Figure 7:
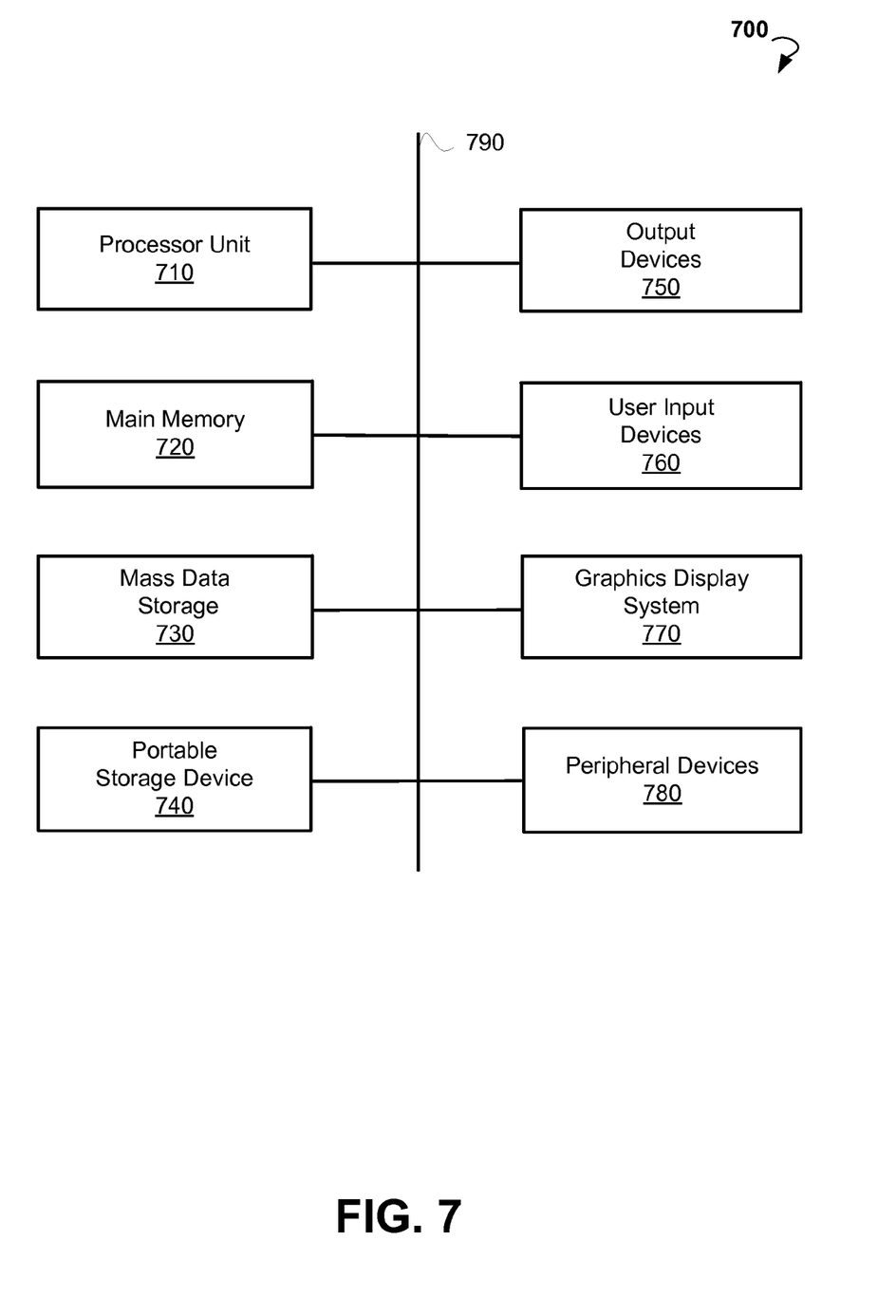
FIG. 7 is a computer system which can be used to implement methods for the present technology, according to an example embodiment.

FIG. 7 illustrates an exemplary computer system 700 that may be used to implement some embodiments of the present invention. The computer system 700 of FIG. 7 may be implemented in the contexts of the likes of computing systems, networks, servers, or combinations thereof. The computer system 700 of FIG. 7 includes one or more processor units 710 and main memory 720. Main memory 720 stores, in part, instructions and data for execution by processor units 710. Main memory 720 stores the executable code when in operation, in this example. The computer system 700 of FIG. 7 further includes a mass data storage 730, portable storage device 740, output devices 750, user input devices 760, a graphics display system 770, and peripheral devices 780.

The components shown in FIG. 7 are depicted as being connected via a single bus 790. The components may be connected through one or more data transport means. Processor unit 710 and main memory 720 is connected via a local microprocessor bus, and the mass data storage 730, peripheral device(s) 780, portable storage device 740, and graphics display system 770 are connected via one or more input/output (I/O) buses.

Mass data storage 730, which can be implemented with a magnetic disk drive, solid state drive, or an optical disk drive, is a non-volatile storage device for storing data and instructions for use by processor unit 710. Mass data storage 730 stores the system software for implementing embodiments of the present disclosure for purposes of loading that software into main memory 720.

Portable storage device 740 operates in conjunction with a portable non-volatile storage medium, such as a flash drive, floppy disk, compact disk, digital video disc, or Universal Serial Bus (USB) storage device, to input and output data and code to and from the computer system 700 of FIG. 7. The system software for implementing embodiments of the present disclosure is stored on such a portable medium and input to the computer system 700 via the portable storage device 740.

User input devices 760 can provide a portion of a user interface. User input devices 760 may include one or more microphones, an alphanumeric keypad, such as a keyboard, for inputting alphanumeric and other information, or a pointing device, such as a mouse, a trackball, stylus, or cursor direction keys. User input devices 760 can also include a touchscreen. Additionally, the computer system 700 as shown in FIG. 7 includes output devices 750. Suitable output devices 750 include speakers, printers, network interfaces, and monitors.

Graphics display system 770 include a liquid crystal display (LCD) or other suitable display device. Graphics display system 770 is configurable to receive textual and graphical information and processes the information for output to the display device.

Peripheral devices 780 may include any type of computer support device to add additional functionality to the computer system.

The components provided in the computer system 700 of FIG. 7 are those typically found in computer systems that may be suitable for use with embodiments of the present disclosure and are intended to represent a broad category of such computer components that are well known in the art. Thus, the computer system 700 of FIG. 7 can be a personal computer (PC), hand held computer system, telephone, mobile computer system, workstation, tablet, phablet, all-in-one, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, TIZEN and other suitable operating systems.

The processing for various embodiments may be implemented in software that is cloud-based. In some embodiments, the computer system 700 is implemented as a cloud-based computing environment, such as a virtual machine operating within a computing cloud. In other embodiments, the computer system 700 may itself include a cloud-based computing environment, where the functionalities of the computer system 700 are executed in a distributed fashion. Thus, the computer system 700, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 700, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

The present technology is described above with reference to example embodiments. Therefore, other variations upon the example embodiments are intended to be covered by the present disclosure.

What is claimed is:

1. A method for modeling user possession of a mobile device for a user authentication framework, the method comprising:
   analyzing sensor data, the sensor data representing information captured from sensors associated with at least two of a plurality of devices;
   determining, based on the analyzed sensor data, a probability that the user is in possession of the mobile device, the mobile device being one of the plurality of the devices; and configuring the probability for use in determining whether to require authentication,
   wherein the determination of the probability that the user is in possession of the mobile device is further based on an analysis of a difference between a first action of the user represented by the sensor data associated with a first one of the two devices and a second action of the user represented by the sensor data associated with a second one of the two devices;
   allowing the user to access a first set of functionality of the mobile device without requiring authentication based on the determined probability being higher than a first threshold; and
   requiring the user to perform authentication in order to access a second set of functionality of the mobile device based on the determined probability being lower than a second threshold.

2. The method of claim 1, wherein devices of the plurality of the devices are communicatively coupled via a network and operable to exchange the sensor data with each other.

3. The method of claim 1, wherein the sensors include at least one of the following: motion sensors, inertial sensors, visual sensors, location sensors, bio sensors, audio sensors, and proximity sensors.

4. The method of claim 1, wherein the sensor data comprises a representation of a feed from one or more social networks.

5. The method of claim 1, wherein the determining probability that user possesses the mobile device comprises:
   configuring a first probabilistic model, the first probabilistic model including at least two states, the at least two states including a first state indicating that the user possesses the mobile device and a second state indicating that the user does not possess the mobile device;
   classifying motions of the mobile device by types, the motions being determined based on the sensor data received from one or more devices of the plurality of the devices; and
   updating probabilities of the at least two states in response to determining that at least one of the motions has occurred.

6. The method of claim 5, wherein the probabilities of the at least two states are updated based on a type of the at least one of the motions, probability of determining the at least one of the motions, and a number of motions occurring in a pre-determined time period.

7. The method of claim 5, further comprising:
   determining a location of the mobile device relative to the user, the location of the mobile device being determined based on the sensor data using a second probabilistic model; and
   adjusting the probability of the at least two states and probabilities of determining the motions based on the determined location of the mobile device.

8. A method, for modeling user possession of a mobile device for a user authentication framework, the method comprising:
   analyzing sensor data, the sensor data representing information captured from one or more sensors associated with at least one of a plurality of devices;
   determining, based on the analyzed sensor data, a probability that the user is in possession of the mobile device, the mobile device being one of the plurality of the devices; and configuring the probability for use in determining whether to require authentication, wherein the determining probability that user possesses the mobile device comprises: configuring a first probabilistic model, the first probabilistic model including at least two states, the at least two states including a first state indicating that the user possesses the mobile device and a second state indicating that the user does not possess the mobile device;
   classifying motions of the mobile device by types, the motions being determined based on the sensor data received from one or more devices of the plurality of the devices; and
   updating probabilities of the at least two states in response to determining that at least one of the motions has occurred, and
   wherein probabilities of the at least two states are reset to predetermined initial values using a user authentication mechanism of the mobile device provided by an original equipment manufacturer;
   allowing the user to access a first set of functionality of the mobile device without requiring authentication based on the determined probability being higher than a first threshold; and
   requiring the user to perform authentication in order to access a second set of functionality of the mobile device based on the determined probability being lower than a second threshold.

9. The method of claim 1, wherein the determined probability is further configured for use in granting access to a number and a type of applications.

10. The method of claim 5, wherein a location of the mobile device with respect to the user and the probabilities of the two states are provided to the mobile device to facilitate determining whether to require the user to provide active authentication in the form of at least one of credentials and a fingerprint.

11. The method of claim 1, further comprising:
based upon the determining, based on the analyzed sensor data, of the probability that the user is in possession of the mobile device, causing a reduction of power consumption of the mobile device.

12. A system for modeling user possession of a mobile device for a user authentication framework, the system comprising a plurality of devices including the mobile device, the mobile device comprising: a processor; and
  a memory communicatively coupled to the processor, the memory storing instructions which when executed by the processor perform a method comprising:
  analyzing sensor data, the sensor data representing information captured from sensors associated with at least two of a the plurality of devices;
  determining, based on the analyzed sensor data, a probability that the user is in possession of the mobile device; and
  configuring the probability for use in determining whether to require authentication,
  wherein the determination of the probability that the user is in possession of the mobile device is further based on an analysis of a difference between a first action of the user represented by the sensor data associated with a first one of the two devices and a second action of the user represented by the sensor data associated with a second one of the two devices;
  allowing the user to access a first set of functionality of the mobile device without requiring authentication based on the determined probability being higher than a first threshold; and
  requiring the user to perform authentication in order to access a second set of functionality of the mobile device based on the determined probability being lower than a second threshold.

13. The system of claim 12, wherein devices of the plurality of the devices are communicatively coupled via a network and operable to exchange the sensor data with each other.

14. The system of claim 12, wherein the sensors include at least one of the following:
  motion sensors, inertial sensors, visual sensors, location sensors, bio sensors, audio sensors, proximity sensors, and a feed from one or more social networks.

15. The system of claim 12, wherein determining probability that user possesses the mobile device comprises:
  configuring a first probabilistic model, the first probabilistic model including at least two states, the at least two states including a first indicative of the user possessing the mobile device and a second state indicative of the user not possessing the mobile device;
  classifying motions of the mobile device by types, the motions being determined based on the sensor data received from one or more devices of the plurality of the devices; and
  updating probabilities of the at least two states in response to determining that at least one of the motions has occurred.

16. The system of claim 15, wherein the probabilities of the at least two states are updated based on type of at least one of the motions, a probability of determining the at least one of the motions, and a number of motions occurring in a pre-determined time period.

17. The system of claim 15, further comprising:
  determining a location of the mobile device relative to the user, the location of the mobile device being determined based on the sensor data using a second probabilistic model; and
  adjusting the probability of the at least of two states and probabilities of determining the motions based on the determined location of the mobile device.

18. A non-transitory computer-readable storage medium having embodied thereon instructions, which when executed by one or more processors, perform a method modeling user possession of a mobile device for a user authentication framework, the method comprising:
  analyzing sensor data, the sensor data representing information captured from one or more sensors associated with at least two of a plurality of devices;
  determining, based on the analyzed sensor data, a probability that the user is in possession of the mobile device, the mobile device being one of the plurality of the devices; and configuring the probability for use in determining whether to require authentication,
  wherein the determination of the probability that the user is in possession of the mobile device is further based on an analysis of a difference between a first action of the user represented by the sensor data associated with a first one of the two devices and a second action of the user represented by the sensor data associated with a second one of the two devices;
  allowing the user to access a first set of functionality of the mobile device without requiring authentication based on the determined probability being higher than a first threshold; and
  requiring the user to perform authentication in order to access a second set of functionality of the mobile device based on the determined probability being lower than a second threshold.

* * * * *